(12) United States Patent
Meyer et al.

(10) Patent No.: US 11,358,586 B2
(45) Date of Patent: Jun. 14, 2022

(54) METHODS AND SYSTEM FOR LAUNCHING A HYBRID VEHICLE

(71) Applicant: Ford Global Technologies, LLC, Dearborn, MI (US)

(72) Inventors: Jason Meyer, Canton, MI (US); Kevin Ruybal, Canton, MI (US); Bhavesh Paradkar, Canton, MI (US); Todd Mccullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 16/391,208

(22) Filed: Apr. 22, 2019

(65) Prior Publication Data

US 2020/0331455 A1    Oct. 22, 2020

(51) Int. Cl.
*B60W 20/19* (2016.01)
*B60W 10/08* (2006.01)
*B60W 10/06* (2006.01)
*B60W 30/18* (2012.01)
*B60W 10/02* (2006.01)
*B60K 6/48* (2007.10)

(52) U.S. Cl.
CPC ............ *B60W 20/19* (2016.01); *B60W 10/02* (2013.01); *B60W 10/06* (2013.01); *B60W 10/08* (2013.01); *B60W 30/18027* (2013.01); *B60K 6/48* (2013.01); *B60W 2510/083* (2013.01); *B60W 2520/04* (2013.01); *B60W 2520/10* (2013.01); *B60W 2540/10* (2013.01); *B60W 2710/021* (2013.01); *B60W 2710/027* (2013.01); *B60W 2710/083* (2013.01); *B60W 2720/30* (2013.01); *B60Y 2200/92* (2013.01)

(58) Field of Classification Search
CPC ............ B60K 6/448; B60K 6/48; B60K 6/52; B60W 10/02; B60W 10/06; B60W 10/08; B60W 20/15; B60W 20/19; B60W 2510/083; B60W 2520/04; B60W 2520/10; B60W 2540/10; B60W 2710/021; B60W 2710/027; B60W 2710/083; B60W 2720/30; B60W 30/18027; B60Y 2200/92
See application file for complete search history.

(56) References Cited

U.S. PATENT DOCUMENTS

| | | | |
|---|---|---|---|
| 8,224,544 B2 * | 7/2012 | Sah | B60W 10/02 701/67 |
| 8,647,231 B2 * | 2/2014 | Soliman | B60W 10/02 477/181 |
| 8,706,337 B2 * | 4/2014 | Rauner | B60L 50/16 477/3 |
| 9,045,136 B2 | 6/2015 | Frank et al. | |

(Continued)

OTHER PUBLICATIONS

Meyer, J. et al., "Hybrid Vehicle Launching Methods and System," U.S. Appl. No. 16/391,225, filed Apr. 22, 2019, 52 pages.

*Primary Examiner* — Babar Sarwar
(74) *Attorney, Agent, or Firm* — Geoffrey Brumbaugh; McCoy Russell LLP

(57) ABSTRACT

Methods and systems are provided for operating a hybrid vehicle during launch conditions from rest. In one example, a driver demand torque is held constant until a threshold vehicle speed is reached when a constant accelerator pedal position is present so that closing of a transmission input clutch may result in reduced driveline torque disturbances while a desired driver demand torque is delivered.

20 Claims, 8 Drawing Sheets

(56) References Cited

U.S. PATENT DOCUMENTS

| | | | |
|---|---|---|---|
| 9,393,951 B2 | 7/2016 | Reed et al. | |
| 9,481,235 B1* | 11/2016 | Banshoya | B60W 20/30 |
| 9,616,884 B1* | 4/2017 | Cho | B60W 10/08 |
| 9,956,954 B2* | 5/2018 | Hata | B60K 6/445 |
| 9,987,917 B2* | 6/2018 | Oba | B60L 50/61 |
| 10,100,884 B2* | 10/2018 | Kim | F16D 48/06 |
| 2012/0083385 A1* | 4/2012 | Smith | B60W 10/02 |
| | | | 180/65.265 |
| 2013/0041562 A1* | 2/2013 | Mair | B60W 10/02 |
| | | | 701/67 |
| 2014/0088805 A1* | 3/2014 | Tulpule | B60K 6/442 |
| | | | 180/65.265 |
| 2016/0016580 A1* | 1/2016 | Johri | B60W 10/08 |
| | | | 180/65.265 |
| 2016/0137182 A1* | 5/2016 | Johri | F16H 61/16 |
| | | | 180/65.265 |
| 2016/0375893 A1* | 12/2016 | Nefcy | B60W 10/184 |
| | | | 180/65.265 |
| 2017/0021824 A1* | 1/2017 | Johri | B60W 50/10 |
| 2018/0118196 A1* | 5/2018 | Doering | B60W 10/02 |
| 2018/0244260 A1 | 8/2018 | Ruybal et al. | |
| 2018/0326988 A1* | 11/2018 | Lechlitner | B60W 10/08 |
| 2020/0331456 A1* | 10/2020 | Meyer | B60W 30/18027 |

* cited by examiner

METHODS AND SYSTEM FOR LAUNCHING A HYBRID VEHICLE

FIELD

The present description relates generally to methods and systems for launching a hybrid vehicle from a rest condition. The methods and systems may be particularly useful for hybrid vehicles that include a transmission clutch.

BACKGROUND/SUMMARY

A hybrid vehicle may include a transmission clutch that may selectively decouple an internal combustion engine from a driveline that includes an electric machine. In particular, the transmission clutch may be opened when a driver demand wheel torque is low so that the internal combustion engine may be stopped to conserve fuel. The transmission clutch may be closed and the engine started when driver demand wheel torque exceeds a threshold torque. The transmission clutch's torque capacity (e.g., an amount of torque that the transmission clutch may transfer between the engine and the driveline) may be increased to meet driver demand torque; however, the transmission clutch torque capacity may not always be consistent when applying a threshold amount of force to close the transmission clutch. If the transmission clutch torque capacity is not consistent, then driver expectations of vehicle performance and drivability may not be met. Therefore, it may be desirable to provide a way of meeting driver expectations during a vehicle launch.

The inventors herein have recognized the above-mentioned issues and have developed a vehicle operating method, comprising: generating a constant driver demand torque in response to a constant accelerator pedal position up to a threshold vehicle speed; and decreasing the constant driver demand torque in response to the constant accelerator pedal position in response to vehicle speed exceeding the threshold vehicle speed.

By generating a constant driver demand torque in response to a constant accelerator pedal position from zero vehicle speed up to a threshold vehicle speed, it may be possible to provide improved low vehicle speed vehicle drivability while providing an expected driving experience. A constant driver demand torque may be delivered via an electric machine while a transmission clutch is being closed so that driveline torque may oscillate less when driver demand torque is being provided via a combination of electric machine torque and torque that is delivered via a transmission clutch. The constant driver demand torque may be provided in lieu of a decreasing electric machine output while torque capacity of the transmission clutch is increasing during a vehicle launch so that if the torque capacity of the transmission clutch does not increase as expected, the driveline may still provide a significant portion of the driver demand torque. As such, vehicle drivability may be improved.

The present description may provide several advantages. In particular, the approach may provide improved vehicle drivability when a transmission clutch is being closed in response to a driver demand torque or a request for electric energy storage device charging. Further, the approach simplifies control strategy for delivering a desired driver demand torque. In addition, the approach coordinates driver demand torque delivery and the timing of transmission clutch closing so that driveline torque delivery may be made more consistent.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
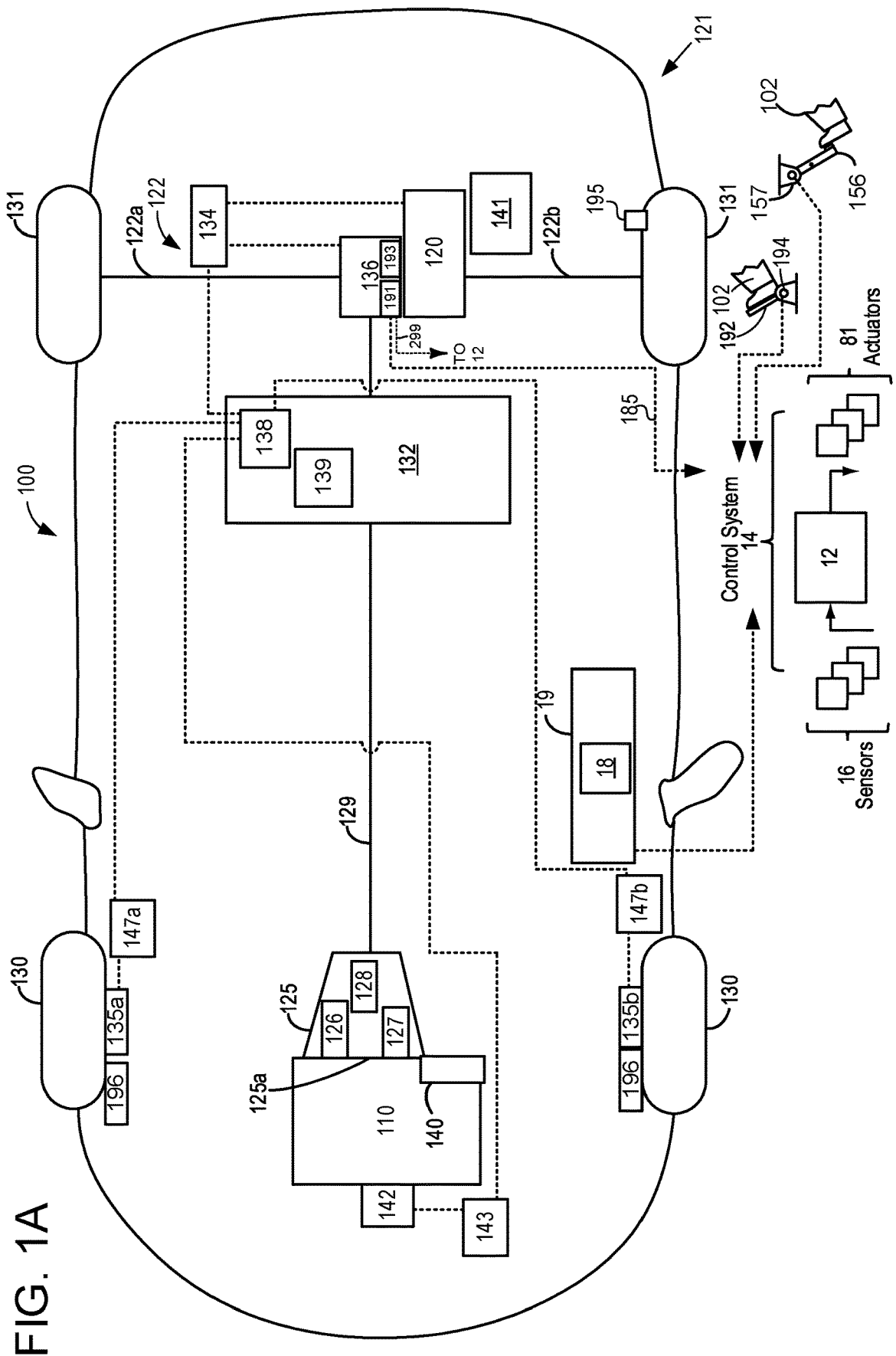
FIG. 1A is a schematic diagram of a hybrid vehicle driveline.
Figure 2:
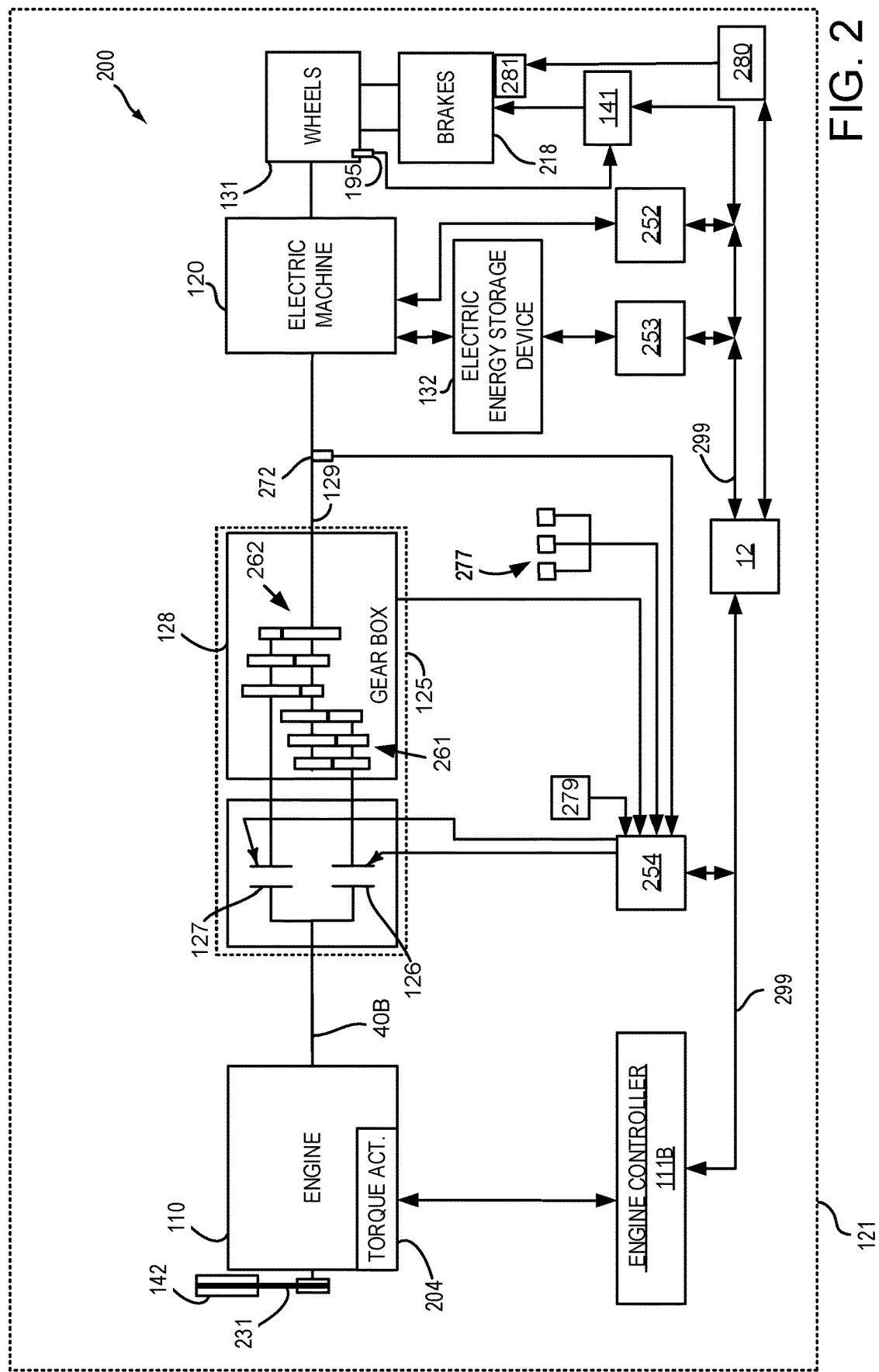
FIG. 2 is a schematic diagram of the hybrid vehicle driveline including controllers of various driveline components.
Figure 3:
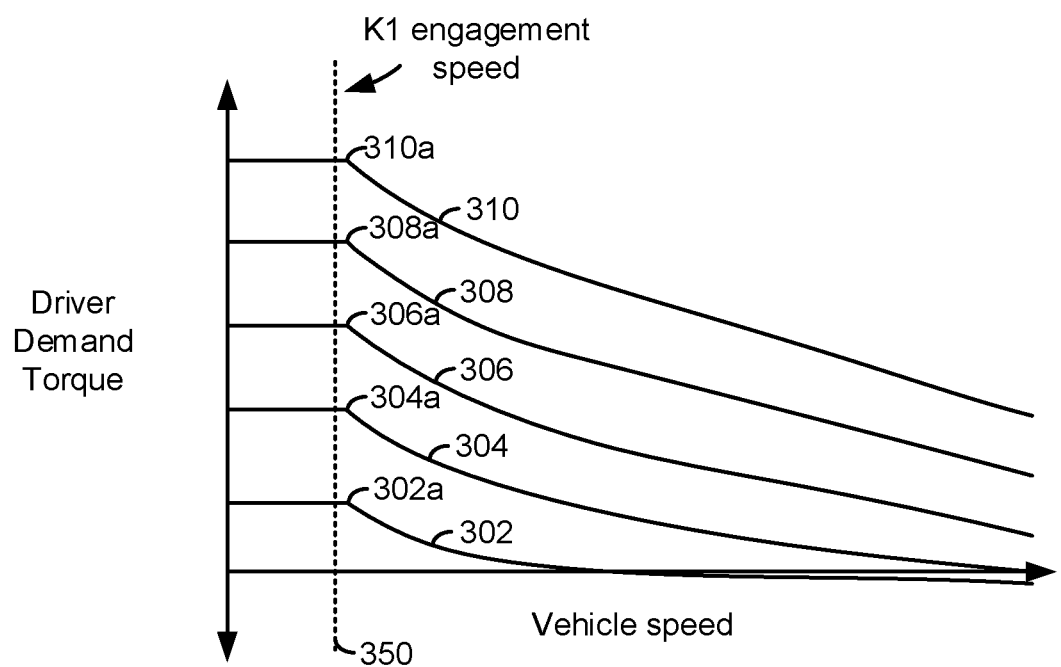
FIGS. 3 and 4 are plots of example driver demand torque values versus vehicle speed.
Figure 4:
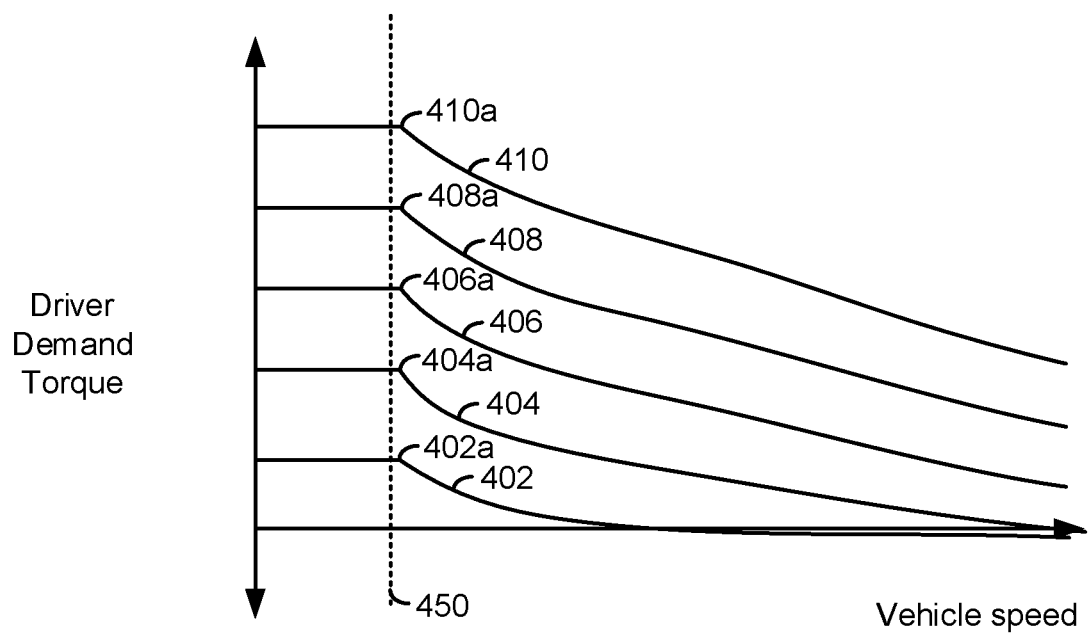
Figure 5:
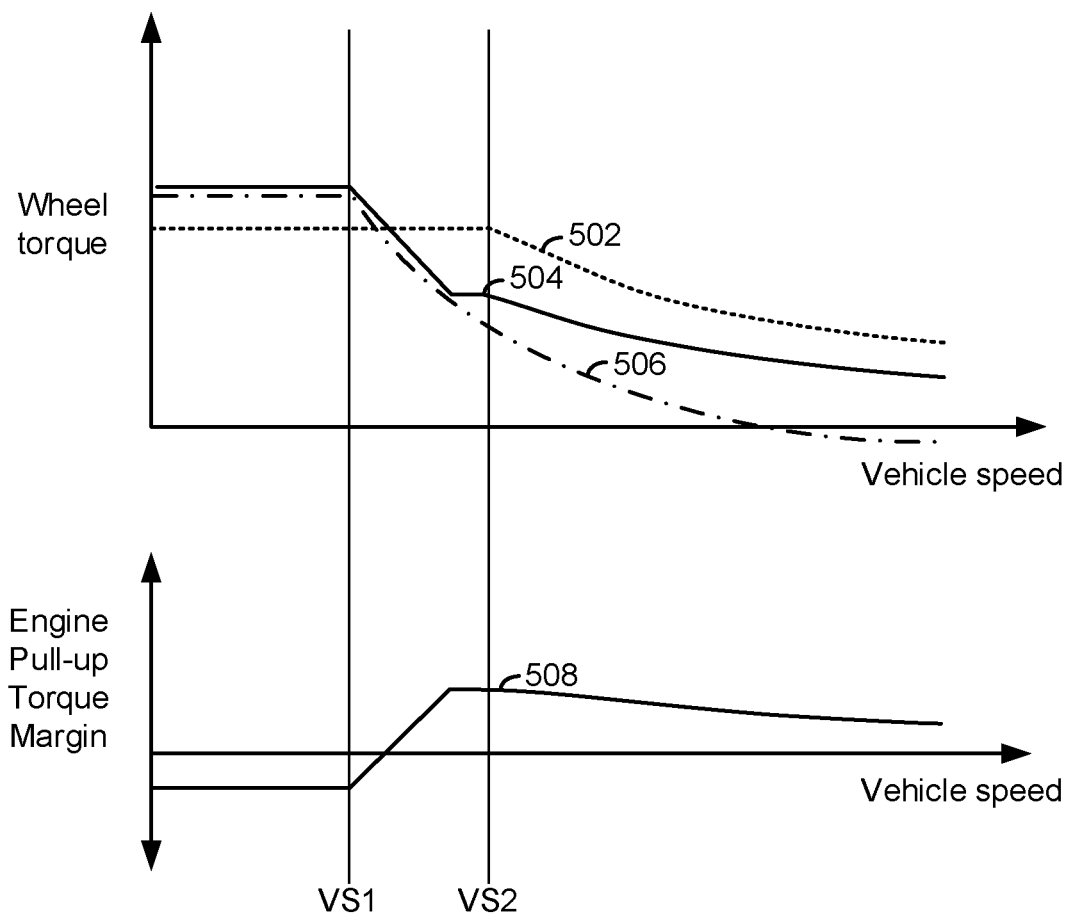
FIG. 5 shows plots that illustrate how an engine pull-up margin torque may be aligned with electric machine torque capability so that engine starting may be avoided during conditions where driver demand torque is sufficient to initiate engine starting for only a short period of time.
Figure 6:
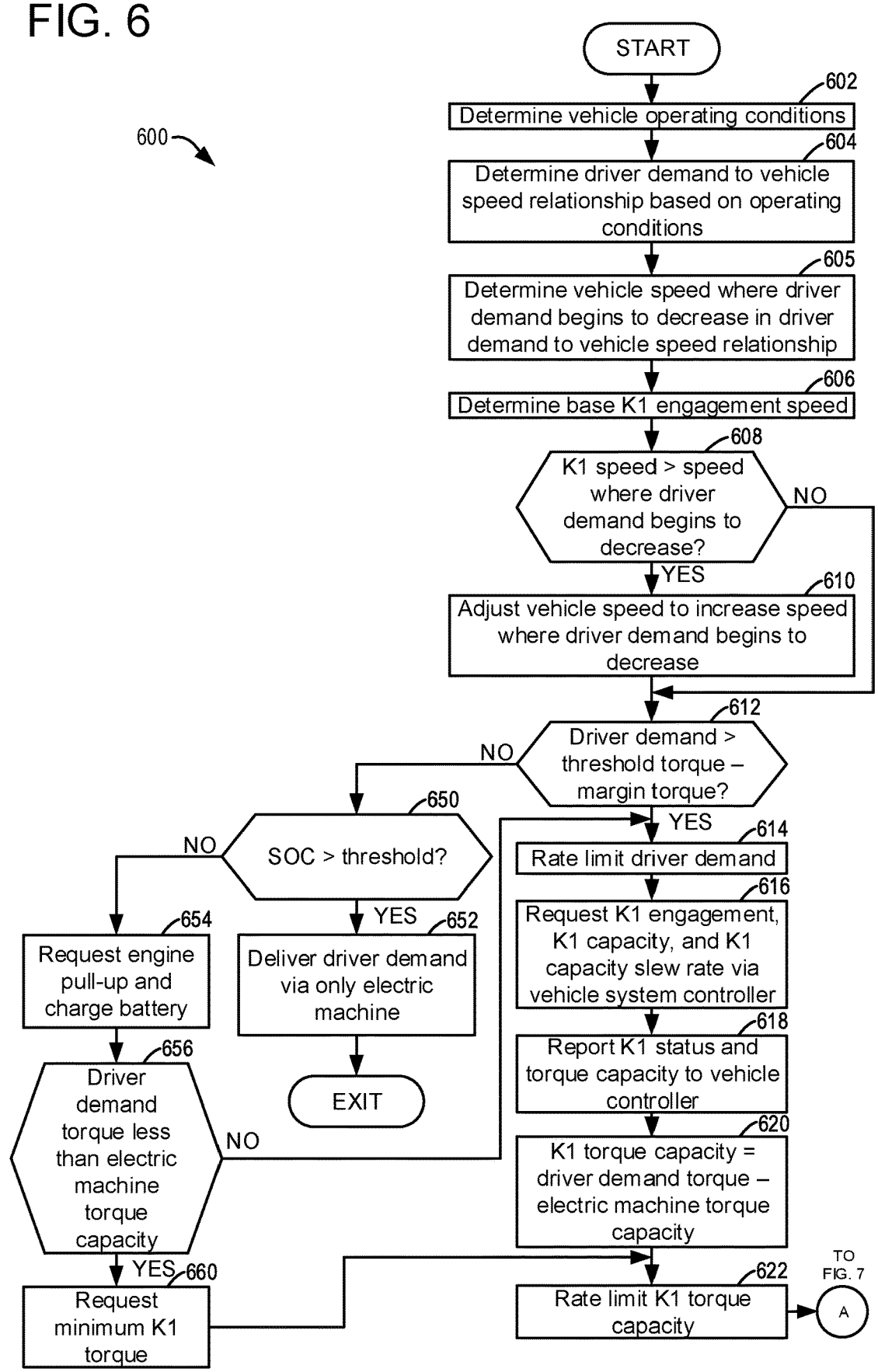
FIGS. 6 and 7 show an example method for operating a hybrid vehicle driveline during a vehicle launch from zero speed or rest.
Figure 7:
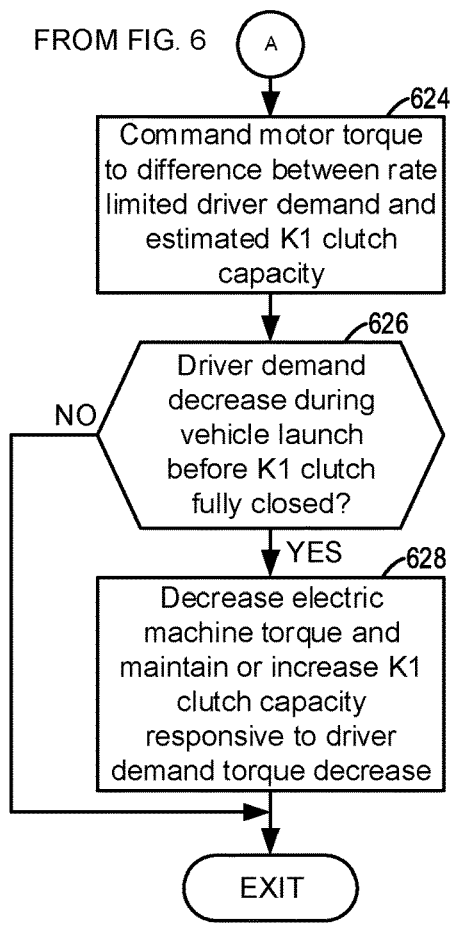

The following description relates to systems and methods for operating a driveline of a hybrid vehicle. FIGS. 1A-2 show an example hybrid vehicle system that includes a driveline with an internal combustion engine, an integrated starter/generator, a dual clutch transmission, and an electric machine that may be operated in a regeneration mode to store a vehicle's kinetic as electrical energy. FIGS. 3 and 4 show driver demand torque as a function of accelerator pedal position and vehicle speed. FIG. 5 shows an example of how an engine pull-up margin torque may be aligned with torque capacity of an electric machine to reduce unintended engine starts. A method for operating a hybrid vehicle is shown in FIGS. 6 and 7.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. In this example, front wheels 130 may be electrically driven and rear wheels 131 are driven electrically or via engine 110. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122*a* and to axle 122*b*. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122*a* and 122*b* may be equal when electrically controlled differential clutch is open. Torque transfer to axle 122*a* may be different from torque transferred to axle 122*b* when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110 at a front side of the transmission 125*a*, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127. In another example, transmission 125 may be an automatic step ratio transmission and clutch 126 may be a launch clutch. Clutch 127 may be omitted when transmission 125 is a step ratio transmission. Clutch 126 and clutch 127 may be alternatively referred to as a K1 clutch.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Control system 14 may identify and/or control the amount of electrical energy stored at the energy storage device, which may be referred to as the state of charge (SOC).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135*a* and 135*b* to propel vehicle 121 or to provide regenerative braking via front wheels 130. Friction brakes 196 may be applied to slow front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include, wheel speed sensor(s) 195, ambient temperature/humidity sensor 198, etc. In some examples, sensors associated with engine 110, transmission 125, electric machine 120, etc., may communicate information to controller 12, regarding various states of engine, transmission, and motor operation, as will be discussed in further detail with regard to FIG. 1B and FIG. 2.

Dashboard 19 may include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, electric machines 135a and 135b, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle.

Figure 1B:
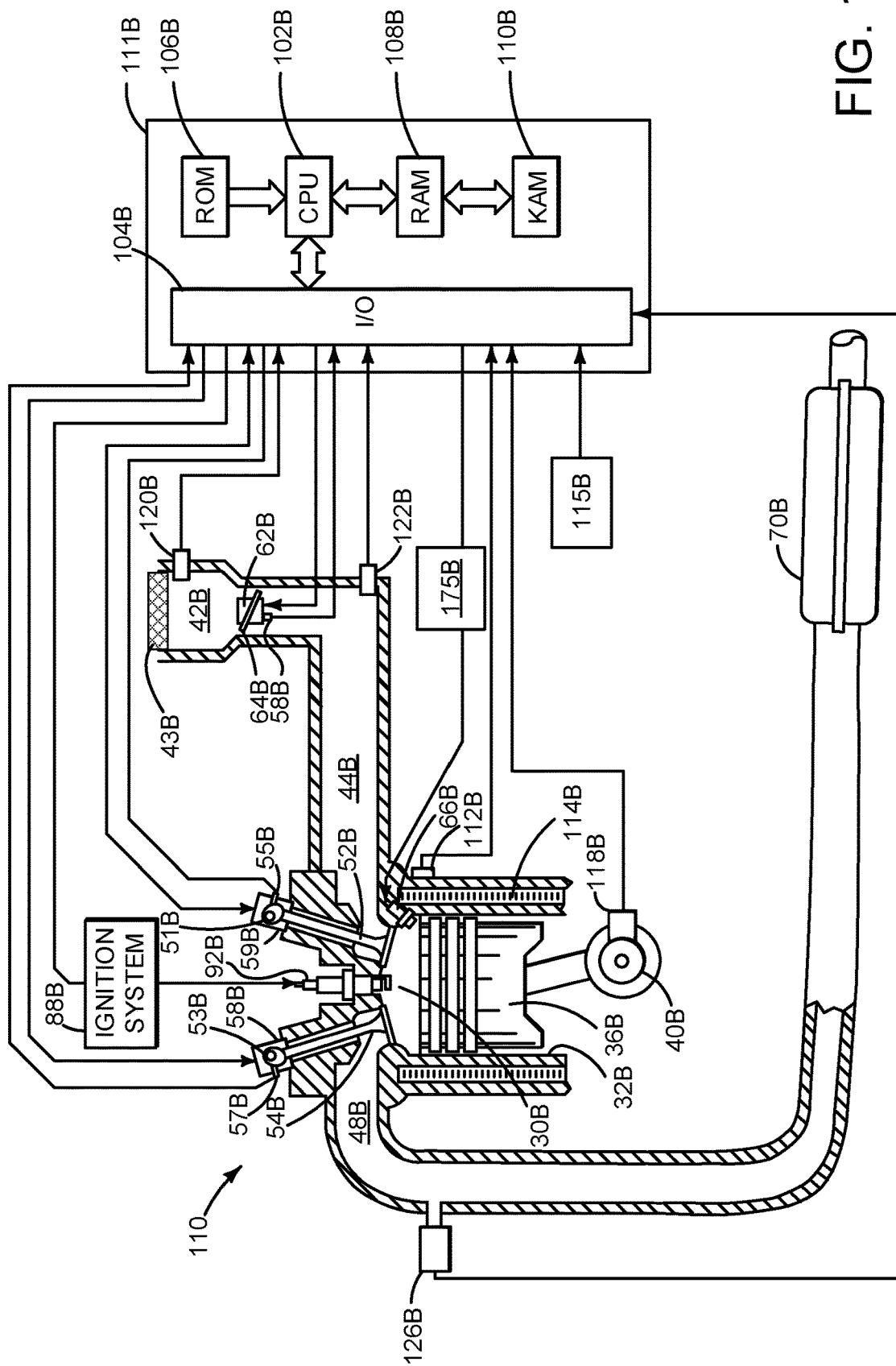
FIG. 1B is a sketch of an engine of the hybrid vehicle driveline.
Figure 1C:
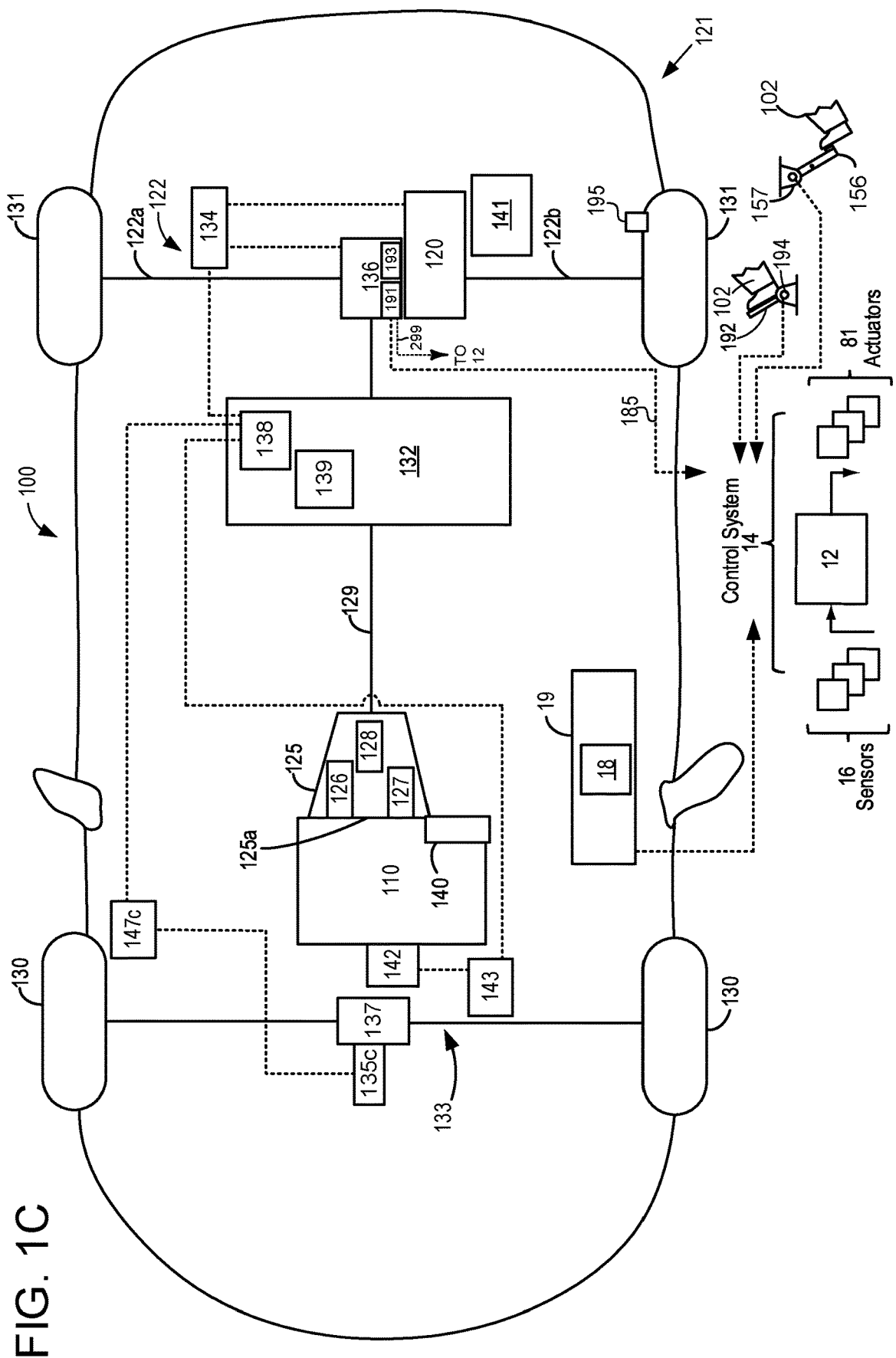
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130 via front drive unit 137, which may include a differential. In some examples, the electric machine 135c and the front drive unit 137 are considered part of front axle 133. Thus, front axle 133 may provide regenerative braking or torque to propel vehicle 121 in response to commands or requests from control system 14. Further, electric machine 135c may receive electrical power from, or provide electrical power to, electric energy storage device 132. Front axle 133 may be referred to as an independently driven axle. The other components shown in FIG. 1C may operate as previously described.

FIG. 2 is a block diagram of vehicle 121 including a powertrain or driveline 200. The powertrain of FIG. 2 includes engine 110 shown in FIG. 1A-1C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140 shown in FIG. 1A), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140 shown in FIG. 1A) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Thus, the system of FIGS. 1A-2 provides for a driveline system, comprising: an internal combustion engine; an electric machine coupled to an axle; an accelerator pedal; and a controller including executable instructions stored in non-transitory memory to generate a driver demand torque that is constant in response to the accelerator pedal being at a constant position when a vehicle speed is less than a threshold speed, and the driver demand torque being reduced in response to the vehicle speed being greater than the threshold speed while the accelerator pedal is at the constant position. The driveline system further comprises additional instructions to decrease the driver demand torque in response to releasing the accelerator pedal. The driveline system further comprises a transmission input clutch that selectively couples the internal combustion engine to a driveline and additional instructions to at least partially close the transmission input clutch in response to the driver demand torque being greater than a threshold torque minus a margin torque. The threshold torque may be a torque capacity of an electric machine. The driveline system further comprises additional instructions to decrease an output torque of the electric machine and maintain or increase a torque capacity of the transmission input clutch in response to a decrease in the driver demand torque. The driveline system further comprises additional instructions to adjust a torque capacity of the transmission input clutch in response to the driver demand torque minus an electric machine torque capacity. The driveline system further comprises additional instructions to adjust a torque output of the electric machine in response to a torque difference between a rate limited driver demand torque and an estimated torque capacity of a transmission input clutch.

In another representation, the system of FIGS. 1A-2 provides for a driveline system, comprising: an internal combustion engine coupled to a rear axle; an electric machine coupled to a front axle; an accelerator pedal; and a controller including executable instructions stored in non-transitory memory to generate a driver demand torque that is constant in response to the accelerator pedal being at a constant position when a vehicle speed is less than a threshold speed, and the driver demand torque being reduced in response to the vehicle speed being greater than the threshold speed while the accelerator pedal is at the constant position, the driver demand torque delivered via the electric machine coupled to the front axle. The driveline system further comprises additional instructions to decrease the driver demand torque in response to releasing the accelerator pedal while increasing torque capacity of a transmission input clutch. The driveline system further comprises a transmission input clutch that selectively couples the internal combustion engine to a driveline.

FIG. 3 shows a relationship between driver demand wheel torque (e.g., torque requested or demanded at vehicle wheels) and vehicle speed. The vertical axis represents driver demand wheel torque and the driver demand wheel torque increases in the direction of the vertical axis arrow. The horizontal axis represents vehicle speed and vehicle speed increases in the direction of the horizontal axis arrow.

Curves 302-310 describe driver demand wheel torques for constant accelerator pedal inputs and varying vehicle speed. For example, curve 302 illustrates driver demand wheel torque when the accelerator pedal is applied at a constant 10% of full scale accelerator pedal travel, where full scale accelerator pedal travel is from a base position to a fully applied position. Curve 304 illustrates driver demand wheel torque when the accelerator pedal is applied at a constant 20% of full scale accelerator pedal travel. Curve 306 illustrates driver demand wheel torque when the accelerator pedal is applied at a constant 30% of full scale accelerator pedal travel. Curve 308 illustrates driver demand wheel torque when the accelerator pedal is applied at a constant 40% of full scale accelerator pedal travel. Curve 310 illustrates driver demand wheel torque when the accelerator pedal is applied at a constant 50% of full scale accelerator pedal. Of course, additional or fewer curves may be provided and the accelerator pedal application amounts that are associated with the curves may be different than what has already been described.

Vertical line 350 represents a vehicle speed at which the transmission input clutch (e.g., 126 or 127) or launch clutch is commanded to fully close. The vehicle speed at which the transmission input clutch or launch clutch is commanded to fully closed is shown at a vehicle speed that is less than a vehicle speed where driver demand wheel torque curves 302-310 begin to lower the driver demand wheel torque for the constant accelerator pedal position. Thus, at vehicle speeds that are less than the vehicle speed where the transmission input clutch is commanded closed, the driver demand wheel torque may be provided by one or more of electric machines 120, 135a, 135b, and 135c shown in FIGS. 1A and 1C. In this way, the transmission input or launch clutch may be closed before driver demand wheel torque for a constant accelerator pedal position begins to decline so that the possibility of driveline torque disturbances may be reduced.

Curves 302-310 are shaped to provide an increase in driver demand wheel torque per percent application of the accelerator pedal to be larger at lower vehicle speeds and smaller at higher vehicle speeds. For example, driver demand wheel torque may increase by 1000 Newton-meters for a ten percent increase in accelerator pedal position from a reference accelerator pedal position when vehicle speed is less than 10 kilometers per hour, but the same ten percent increase in accelerator pedal position from the reference accelerator pedal position may increase driver demand wheel torque by 400 Newton-meters when vehicle speed is 35 kilometers per hour. By mapping driver demand wheel torque to accelerator pedal position in this way, vehicle drivability may be improved and customer expectations may be met for vehicle torque and acceleration. For a constant accelerator pedal position, a requested driver demand wheel torque follows curve 302. Curve 302 requests a constant driver demand wheel torque from zero vehicle speed up to a vehicle speed that is slightly greater than the vehicle speed at vertical line 350, then at 302a the driver demand wheel torque request is reduced as vehicle speed increases even though the accelerator pedal position remains constant. Curves 304-310 request driver demand wheel torque in a similar way as curve 302 does, but curves 304-310 request driver demand wheel torque for greater levels of accelerator pedal application. Curves 304-310 request constant driver demand wheel torques at lower vehicle speeds, and then, at 304a, 306a, 308a, and 310a the requested driver demand wheel torque is decreased as vehicle speed increases.

FIG. 4 shows an alternative or second relationship between driver demand wheel torque (e.g., torque requested or demanded at vehicle wheels) and vehicle speed. The vertical axis represents driver demand wheel torque and the driver demand torque increases in the direction of the vertical axis arrow. The horizontal axis represents vehicle speed and vehicle speed increases in the direction of the horizontal axis arrow. The vehicle speed and driver demand torque axis scaling for FIG. 4 is the same as shown in FIG. 3.

Curves 402-410 describe driver demand torques for constant accelerator pedal inputs and varying vehicle speed. For example, curve 402 illustrates driver demand torque when the accelerator pedal is applied at a constant 10% of full scale accelerator pedal travel. Curve 404 illustrates driver demand torque when the accelerator pedal is applied at a constant 20% of full scale accelerator pedal travel. Curve 406 illustrates driver demand torque when the accelerator pedal is applied at a constant 30% of full scale accelerator pedal travel. Curve 408 illustrates driver demand torque when the accelerator pedal is applied at a constant 40% of full scale accelerator pedal travel. Curve 410 illustrates driver demand torque when the accelerator pedal is applied at a constant 50% of full scale accelerator pedal travel. Of course, additional or fewer curves may be provided and the accelerator pedal application amounts that are associated with the curves may be different than what has already been described.

Vertical line 450 represents a vehicle speed at which the transmission input clutch (e.g., 126 or 127) or launch clutch is commanded to fully close. The vehicle speed at which the transmission input clutch or launch clutch is commanded to fully closed is shown at a vehicle speed that is less than a vehicle speed where driver demand curves 402-410 begin to lower the driver demand torque for the constant accelerator pedal position. Thus, at vehicle speeds that are less than the vehicle speed where the transmission input clutch is commanded closed, the driver demand torque may be provided by one or more of electric machines 120, 135a, 135b, and 135c shown in FIGS. 1A and 1C.

Curves 402-410 are shaped similarly to curves 302-310, but curves 402-410 deliver or request a constant driver demand at greater vehicle speeds than curves 302-310. In other words, the driveline may generate a constant driver demand at greater vehicle speeds when driver demand is determined from curves 402-410 as compared to when driver demand is determined from curves 302-310 for constant accelerator pedal positions. The driveline may be operated according to curves 302-310 when the vehicle is operating in a baseline mode, and the driveline may be operated according to curves 402-410 when the vehicle is operating in a performance mode. For a constant accelerator pedal position, a requested driver demand wheel torque follows curve 402. Curve 402 requests a constant driver demand wheel torque from zero vehicle speed up to a vehicle speed that is slightly greater than the vehicle speed at vertical line 450, then at 402a the driver demand wheel torque request is reduced as vehicle speed increases even though the accelerator pedal position remains constant. Curves 404-410 request driver demand wheel torque in a similar way as curve 402 does, but curves 404-410 request driver demand wheel torque for greater levels of accelerator pedal application. Curves 404-410 request constant driver demand wheel torques at lower vehicle speeds, and then, at 404a, 406a, 408a, and 410a the requested driver demand wheel torque is decreased as vehicle speed increases.

Referring now to FIG. 5, plots are shown that illustrate how an engine pull-up margin torque may be aligned with electric machine torque capability so that engine starting may be avoided during conditions where the motor capacity is briefly insufficiently to meet the unfiltered driver demand torque.

The first plot from the top of FIG. 5 includes a vertical axis representing wheel torque and a horizontal axis representing vehicle speed. The wheel torque increases in the direction of the vertical axis arrow and the vehicle speed increases in the direction of the horizontal axis arrow. Dashed line 502 describes an amount of wheel torque that may be generated via an electric machine (e.g., electric machines 120, 135a, 135b, and 135c shown in FIGS. 1A and 1C) in relation to vehicle speed. Solid line 504 describes an amount of driver demand wheel torque that initiates an engine pull-up (e.g., an engine start (combustion in the engine and rotation of the engine after the engine was stopped) from rest) at a time when the engine is stopped. Dash-dot line 506 indicates a driver demand torque for a constant accelerator pedal position. The vertical line at VS1 is a vehicle speed at which the constant pedal driver demand torque begins to decrease with increasing vehicle speed. Vehicle speed VS2 may be a vehicle speed at which the electric machine torque capacity begins to be reduced from a constant value. In some examples, electric machine torque may be reduced at VS2 when the electric machine is in a field weakening mode to increase electric machine speed. In these examples, electric machine torque capacity may be constant below VS2 where the electric machine may be operated at full field strength.

The second plot from the top of FIG. 5 includes a vertical axis representing engine pull-up torque margin and a horizontal axis representing vehicle speed. The engine pull-up torque margin increases in the direction of the vertical axis arrow above the horizontal axis. The engine pull-up torque margin is negative below the horizontal axis. Vehicle speed increases in the direction of the horizontal axis arrow. Solid line 508 describes the engine pull-up torque margin and vehicle speed relationship.

An engine pull-up may be commanded if the driver demand is within the "engine pull-up torque margin" of the motor torque capability. The engine margin torque 508 may be used to determine the engine pull threshold 504 by subtracting the engine pull-up torque margin 508 from the motor wheel torque capability 502. The engine may be commanded to start when driver demand torque equals electric machine torque capability (e.g., when line 504 is equal to or above line 502) when the margin torque is zero. The engine may be commanded to start when the driver demand torque is less than the electric machine torque capacity (e.g., when line 504 is below line 502) when the margin torque is positive. The engine may be commanded to start when the driver demand torque is greater than the electric machine torque capacity (e.g., when line 504 is above line 502) when the margin torque is negative. A negative margin means an engine start is commanded after driver demand has already exceeded the electric machine torque capability (e.g., a dead pedal response).

The transmission input clutch engagement speed VS1 may be kept below VS2 so that electric machine torque is not being reduced when transmission input clutch is being closed and the torque capacity of the transmission input clutch is being controlled to meet the driver demand torque. By keeping the engagement speed VS1 below VS2, it may be possible to reduce driveline torque disturbances since torque capacity of the electric machine may provide the requested driver demand torque before torque capacity of the electric machine changes in the presence of a changing transmission input clutch torque capacity. Further, by adjusting the engine pull-up torque margin to negative values at lower vehicle speeds, the engine need not be started as soon as the torque capacity of the electric machine is exceeded. Consequently, as the vehicle speed increases while the accelerator pedal position is constant, the driver demand torque may decrease to a level below the electric machine torque capacity so that the engine is not started when the margin torque is negative. However, if the driver demand torque exceeds the electric machine torque capacity minus the engine pull-up margin torque, the engine may be started.

Referring now to FIGS. 6 and 7, an example method for operating a hybrid driveline to improve driveline efficiency via regeneration is shown. The method of FIGS. 6 and 7 may be incorporated into and may cooperate with the system of FIGS. 1A-2. Further, at least portions of the method of FIGS. 6 and 7 may be incorporated as executable instructions stored in non-transitory memory while other portions of the method may be performed via a controller transforming operating states of devices and actuators in the physical world.

At 602, method 600 determines vehicle operating conditions. Vehicle operating conditions may include, but are not limited to vehicle speed, driver demand torque, engine temperature, electric machine temperature, engine torque, electric machine torque, K1 clutch torque capacity, electric energy storage device state of charge, electric machine torque capacity, and engine torque capacity. The vehicle operating conditions may be determined via the various vehicle sensors and controller instructions. For example, driver demand wheel torque may be determined based on empirically determined values stored in a table or function in controller random access memory. In particular, driver demand wheel torque may be determined via indexing or referencing the table or function via accelerator pedal position and vehicle speed. The table or function outputs the driver demand wheel torque. Values in the table or function may be determined via operating the vehicle on a chassis dynamometer and adjusting wheel torque based on accelerator pedal position. Method 600 proceeds to 604 after determining vehicle operating conditions.

At 604, method 600 determines a desired driver demand wheel torque to vehicle speed relationship based on vehicle operating conditions. In one example, the desired driver demand wheel torque to vehicle speed relationships may be of the form shown in FIGS. 3 and 4. In one example, a vehicle may include a plurality of desired driver demand wheel torque to vehicle relationships and method 600 may select one of the plurality of desired driver demand wheel torques responsive to input to a human machine interface (e.g., 18 of FIG. 1A). For example, method 600 may select and activate the relationship shown in FIG. 4 when a human driver requests a performance vehicle mode. Method 600 may select and activate the relationship shown in FIG. 3 when the human driver requests a economy vehicle mode. After method 600 selects the desired driver demand wheel torque to vehicle speed relationship, driver demand follows the driver demand of the activated relationship for a given accelerator pedal input and vehicle speed. Method 600 proceeds to 605.

At 605, method 600 determines a vehicle speed at which the driver demand wheel torque value begins to decrease from a constant value. In one example, method 600 may determine the vehicle speed at which the driver demand wheel torque begins to decrease via taking a derivative of driver demand wheel torque with respect to vehicle speed of the selected and activated driver demand wheel torque to vehicle speed relationship. The vehicle speed at which the derivative of driver demand torque turns from zero to negative may be determined to be the vehicle speed at which the driver demand wheel torque begins to decrease from a constant value. Method 600 proceeds to 606.

At 606, method 600 determines a base K1 clutch engagement vehicle speed (e.g., a vehicle speed at which the K1 clutch is commanded fully closed). In one example, the K1 clutch engagement vehicle speed may be adjusted to a predetermined vehicle speed. The predetermined vehicle speed may be a function of driver demand wheel torque, engine idle speed, K1 clutch temperature, vehicle operating mode (e.g., economy/performance), engaged transmission gear, and road grade. For example, the K1 clutch engagement vehicle speed may be a base vehicle speed that may be adjusted responsive to adjustment factors that vary as a function of engine temperature, K1 clutch temperature, ambient air temperature, engine idle speed, driver demand wheel torque, vehicle operating mode, and/or a desired vehicle creep speed. The adjustment factors may increase or decrease the base K1 clutch engagement vehicle speed. Method 600 proceeds to 608.

At 608, method 600 judges if the K1 clutch engagement vehicle speed is greater than the vehicle speed at which the driver demand wheel torque begins to decrease (e.g., determined at 605). If so, the answer is yes and method 600 proceeds to 610. Otherwise, the answer is no and method 600 proceeds to 612.

At 610, method 600 adjusts the actual vehicle speed to generate a pseudo vehicle speed and the driver demand torque is determined via indexing the selected desired driver demand wheel torque to vehicle speed relationship with the pseudo vehicle speed. The pseudo vehicle speed generates a smaller vehicle speed near the K1 clutch engagement vehicle speed so that the K1 clutch engagement vehicle speed is effectively increased. The pseudo vehicle speed stretches the desired driver demand wheel torque to vehicle speed relationship along the vehicle speed axis. This allows the desired driver demand wheel torque to vehicle speed relationship to maintain its shape while increasing the K1 clutch engagement vehicle speed so that a constant driver demand wheel torque is provided at least until the K1 clutch is fully closed. Method 600 proceeds to 612.

At 612, method 600 judges if the driver demand wheel torque is greater than a threshold torque minus a margin torque. In one example, the threshold torque may be a wheel torque that is produced via a driveline electric machine operating at its torque capacity or rated torque (e.g., line 502 of FIG. 5). The margin torque may be empirically determined and it may follow the shape described in FIG. 5. The margin torque may be determined via operating the vehicle on a dynamometer and adjusting margin torque until a desired driveline performance is achieved. If method 600 judges that the driver demand wheel torque is greater than the threshold torque minus the margin torque, then the answer is yes and method 600 proceeds to 614. Otherwise, the answer is no and method 600 proceeds to 650.

At 650, method 600 judges if electric energy storage device state of charge (SOC) is greater than a threshold amount of charge. If method 600 judges that electric energy storage device SOC is greater than a threshold, then the answer is yes and method 600 proceeds to 652. Otherwise, the answer is no and method 600 proceeds to 654.

At 652, method 600 delivers the requested driver demand wheel torque via only the driveline electric machines (e.g., electric machines 120, 135a, 135b, and 135c shown in FIGS. 1A and 1C) and the engine may be stopped (e.g., cease combustion in the engine and cease engine rotation) if the engine is running. The electric machine or machines are commanded to generate the requested driver demand wheel torque. Method 600 proceeds to exit.

At 654, method 600 requests an engine pull-up (e.g., engine start) and charging of the electric energy storage device (e.g., battery). Method 600 proceeds to 656.

At 656, method 600 judges if the driver demand wheel torque is less than the driveline electric machine's capacity to generate wheel torque. If so, method 600 proceeds to 660. Otherwise, the answer is no and method 600 proceeds to 614.

At 660, method 600 requests a minimum K1 torque capacity to fully close the K1 clutch. Further, method 600 reduces torque output of the driveline electric machines (e.g., electric machines 120, 135a, 135b, and 135c shown in FIGS. 1A and 1C) so that the requested driver demand torque may be provided via the engine and the electric machine. The K1 clutch capacity cannot be negative even though the driver demand torque is less than the electric machine torque, so the K1 clutch is commanded to a minimum torque capacity (e.g., a minimum amount of torque that the K1 clutch may transfer from the engine to the driveline) of the K1 clutch so that the K1 clutch may fully close. Method 600 proceeds to 622.

At 614, method 600 starts the engine and imposes a rate limit on the driver demand wheel torque. The engine may be rotated during starting via an integrated starter/generator, a low voltage starter, or other driveline electric machines. The engine is supplied with fuel and spark so that combustion begins in the engine and the engine rotates due to combustion. The driver demand wheel torque is rate limited to shape the wheel torque production such that the driver demand wheel torque may increase by less than a threshold amount of wheel torque in a specified amount of time (e.g., 4000 Newton-meters/second). Method 600 proceeds to 616.

At 616, method 600 requests engagement of the K1 clutch, requests a K1 clutch torque capacity (e.g., a maximum or threshold amount of torque not to be exceeded that the K1 clutch may transfer), and the K1 clutch torque capacity slew rate (e.g., the rate of change in the K1 clutch torque capacity). The K1 clutch torque capacity may be determined as is described at 620. The K1 clutch torque capacity slew rate may be a predetermined value that is a function of K1 clutch temperature and other conditions. Method 600 proceeds to 618.

At 618, method 600 reports the K1 clutch status to the vehicle controller. For example, the present K1 clutch torque capacity may be reported to the vehicle controller. Method 600 proceeds to 620.

At 620, method 600 adjusts the torque capacity of the K1 clutch to equal the driver demand wheel torque minus the electric machine torque capacity (e.g., the maximum amount of torque at the vehicle's wheels that the electric machine may produce) divided by the combined transmission and axle ratio (e.g., K1 capacity=(DDTor−EMtc)/Txaxratio, where K1 capacity is the torque capacity of the K1 clutch, DDTor is the driver demand wheel torque, EMtc is the torque capacity of the electric machine, and Txaxratio is the combined ratio of the transmission and axle). Method 600 proceeds to 622.

At 622, method 600 imposes a rate limit on the K1 clutch torque capacity. The K1 clutch torque capacity is adjusted to a same rate limit as the driver demand torque so that the K1 clutch capacity may keep up with the rate of driver demand wheel torque change. Method 600 proceeds to 624.

At 624, method 600 commands the electric machine torque to the difference between the rate limited driver demand wheel torque and the K1 clutch torque capacity. This allows the electric machine to compensate for any deficiency in the K1 clutch torque capacity. Method 600 proceeds to 626.

At 626, method 600 judges if the driver demand wheel torque begins to decrease during vehicle launch (e.g., vehicle acceleration from less than a threshold speed (zero or near zero) to a threshold speed) due to release or partial release of the accelerator pedal. Method 600 may judge that the driver demand wheel torque is decreasing due to the accelerator pedal when a derivative of accelerator pedal position has a negative sign during a vehicle launch. If method 600 judges that driver demand torque is decreasing due to a reduction in accelerator pedal position, then the answer is yes and method 600 proceeds to 628. Otherwise, the answer is no and method 600 proceeds to exit.

At 628, method 600 decreases torque that is output via the electric machine and maintains or continues to increase K1 clutch torque capacity in response to the driver demand torque decrease that is due to at least partially releasing the accelerator pedal. In particular, the K1 clutch torque capacity may continue to increase at its present rate and torque output of the electric machine may be decreased by the amount of torque capacity increase of the K1 clutch and the amount of decrease in the driver demand wheel torque. For example, if the driver demand wheel torque is decreasing at a rate of 200 Newton-meter/second and the K1 clutch torque capacity is increasing by 400 Newton-meter/second as observed at the vehicle's wheels, then the electric machine torque capacity may be reduced by 600 Newton-meters/second as observed at the vehicle's wheels to provide the driver demand wheel torque at the vehicle's wheels. Method 600 proceeds to exit.

In this way, a constant driver demand wheel torque may be provided to vehicle wheels and a K1 clutch may be closed before torque capacity of a driveline electric machine begins to decrease from a constant torque capacity that the driveline electric machine may provide at lower vehicle speeds. Further, the control of the K1 clutch may be performed independently from the control of the electric machine controller, thereby decreasing control system complexity.

Thus, the method of FIGS. 6 and 7 provides for a vehicle operating method, comprising: generating a constant driver demand torque in response to a constant accelerator pedal position from zero vehicle speed up to a threshold vehicle speed; and decreasing the constant driver demand torque in response to the constant accelerator pedal position in response to vehicle speed exceeding the threshold vehicle speed. The method includes where the constant driver demand torque is generated via an electric machine. The method includes where the electric machine is positioned in a driveline between wheels and a transmission. The method includes where the electric machine is positioned in an axle that does not receive power via an internal combustion engine. The method includes where the electric machine is positioned in a driveline between a transmission and a transmission input clutch. The method further comprises beginning to engage a transmission input clutch at a vehicle speed below the threshold speed. The method further comprises adjusting the vehicle speed at which the transmission input clutch begins to be engaged.

The method of FIGS. 6 and 7 provides for a vehicle operating method, comprising: generating a driver demand wheel torque that is constant in response to a constant accelerator pedal position from zero vehicle speed up to a threshold vehicle speed; decreasing the driver demand wheel torque in response to the constant accelerator pedal position in response to vehicle speed exceeding the threshold vehicle speed; and adjusting a torque capacity of a transmission input clutch in response to the driver demand wheel torque minus an electric machine torque capacity. The method further comprises adjusting an electric machine torque in response to a torque difference between a rate limited driver demand wheel torque and an estimated torque capacity of the transmission input clutch. The method further comprises decreasing the electric machine torque in response to a decrease in driver demand wheel torque. The method further comprises maintaining or increasing the torque capacity of the transmission input clutch in response to the decrease in driver demand wheel torque. The method further comprises adjusting a transmission input clutch engagement speed responsive to a vehicle speed at which the driver demand wheel torque begins to decrease from a constant level while an accelerator pedal is at the constant accelerator position. The method further comprises commanding an engine start in response to the driver demand wheel torque being greater than a threshold torque minus a margin torque. The method includes where the margin torque is negative when generating the driver demand wheel torque that is constant.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
via a controller, generating a driver demand wheel torque that is a constant value from zero vehicle speed up to a threshold vehicle speed in response to an accelerator pedal position that is constant; and
decreasing the driver demand wheel torque from the constant value even though the accelerator pedal position is constant as vehicle speed increases above the threshold vehicle speed.

2. The method of claim 1, where the driver demand wheel torque is generated via an electric machine.

3. The method of claim 2, where the electric machine is positioned in a driveline between wheels and a transmission.

4. The method of claim 2, where the electric machine is positioned in an axle that does not receive power via an internal combustion engine.

5. The method of claim 2, where the electric machine is positioned in a driveline between a transmission and a transmission input clutch.

6. The method of claim 1, further comprising beginning to engage a transmission input clutch at a vehicle speed below the threshold speed.

7. The method of claim 6, further comprising adjusting the vehicle speed at which the transmission input clutch begins to be engaged.

8. The method of claim 7, further comprising adjusting the vehicle speed at which the driver demand wheel torque starts to decrease for the constant accelerator pedal position based on the vehicle speed at which the transmission input clutch begins to be engaged.

9. A vehicle operating method, comprising:
via a controller, generating a driver demand wheel torque that is a constant value in from zero vehicle speed up to a threshold vehicle speed response to an accelerator pedal position that is constant;
decreasing the driver demand wheel torque from the constant value even though the accelerator pedal position is constant as vehicle speed increases above the threshold vehicle speed; and
adjusting a torque capacity of a transmission input clutch in response to the driver demand wheel torque minus an electric machine torque capacity.

10. The method of claim 9, further comprising adjusting an electric machine torque in response to a torque difference between a rate limited driver demand wheel torque and an estimated torque capacity of the transmission input clutch.

11. The method of claim 10, further comprising maintaining or increasing the torque capacity of the transmission input clutch in response to the decrease in driver demand wheel torque.

12. The method of claim 9, further comprising decreasing the electric machine torque in response to the decrease in driver demand wheel torque.

13. The method of claim 9, further comprising adjusting a transmission input clutch engagement speed responsive to a vehicle speed at which the driver demand wheel torque begins to decrease from a constant level while an accelerator pedal is at the constant accelerator pedal position.

14. The method of claim 13, where the margin torque is negative when generating the driver demand wheel torque that is constant.

15. The method of claim 9, further comprising commanding an engine start in response to the driver demand wheel torque being greater than a threshold torque minus a margin torque.

16. A driveline system, comprising:
an internal combustion engine;
an electric machine coupled to an axle;
an accelerator pedal; and
a controller including executable instructions stored in non-transitory memory to generate a driver demand torque that is a constant value in response to the accelerator pedal being at a constant position when a vehicle speed is less than a threshold speed, and reducing the driver demand torque from the constant value in response to the vehicle speed being greater than the threshold speed even though the accelerator pedal is at the constant position.

17. The driveline system of claim 16, further comprising additional instructions to decrease the driver demand torque in response to releasing the accelerator pedal.

18. The driveline system of claim 17, further comprising additional instructions to decrease an output torque of the electric machine and maintain or increase a torque capacity of the transmission input clutch in response to the decrease in the driver demand torque.

19. The driveline system of claim 16, further comprising a transmission input clutch that selectively couples the internal combustion engine to a driveline and additional instructions to at least partially close the transmission input clutch in response to the driver demand torque being greater than a threshold torque minus a margin torque.

20. The driveline system of claim 16, further comprising additional instructions to adjust a torque capacity of the transmission input clutch in response to the driver demand torque minus an electric machine torque capacity.

* * * * *